UNITED STATES PATENT OFFICE.

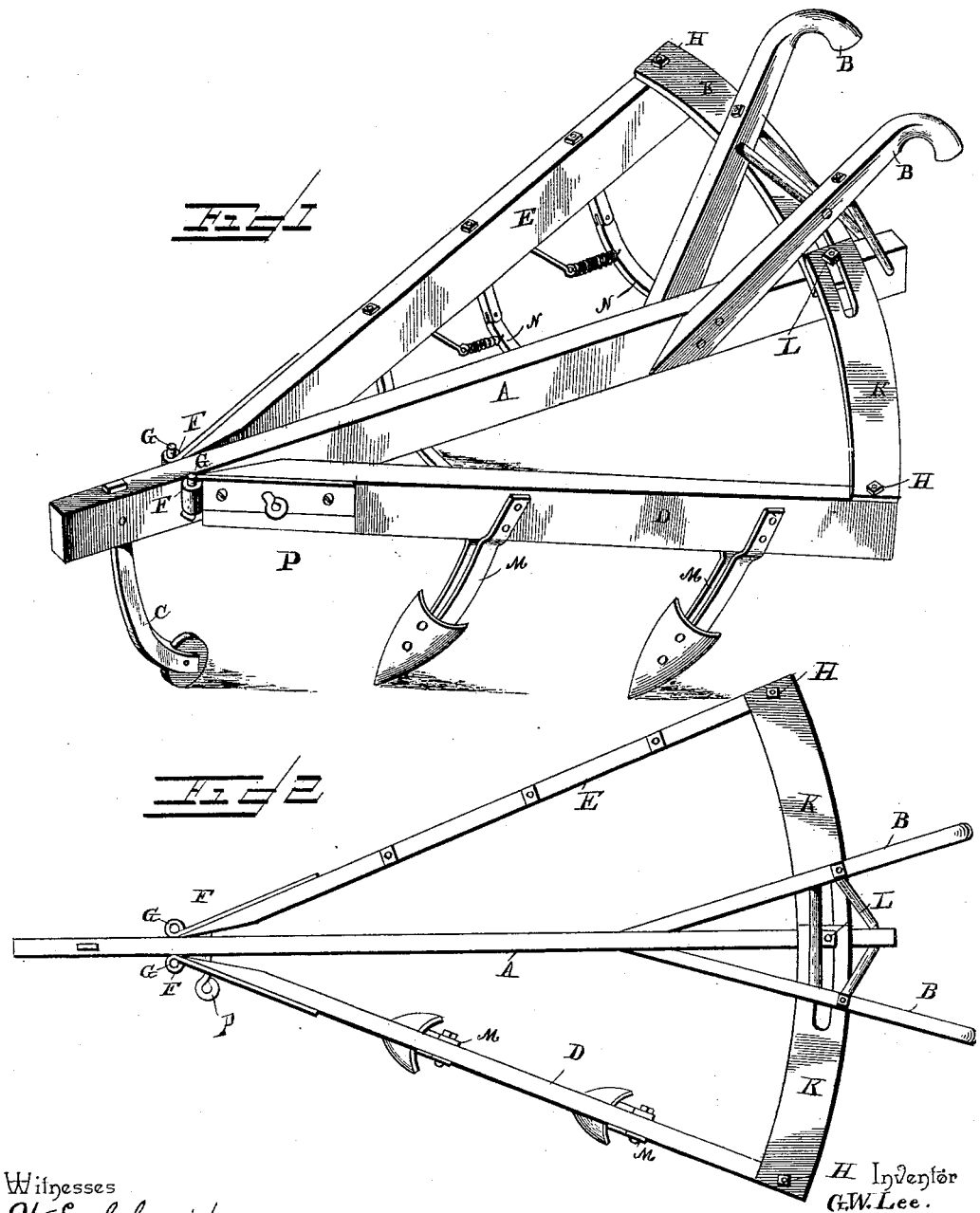

GEORGE W. LEE, OF GRANBURY, TEXAS.

COMBINED PLOW AND HARROW.

SPECIFICATION forming part of Letters Patent No. 495,895, dated April 18, 1893.

Application filed August 31, 1892. Serial No. 444,671. (No model.)

*To all whom it may concern:*

Be it known that I, GEORGE W. LEE, a citizen of the United States, residing at Granbury, in the county of Hood and State of Texas, have invented a new and useful Combined Plow and Harrow, of which the following is a specification.

My invention relates to a combined plow and harrow, adapted to be used simultaneously or detached and used independently, as desired, the object in view being to provide a simple, cheap, and effective machine, capable of adjustment to suit the requirements of different soils and different conditions of the soil.

Further objects and advantages will appear in the following description, and the novel features will be particularly pointed out in the appended claim.

In the drawings, Figure 1 is a perspective view of a cultivator embodying my improvements. Fig. 2 is a plan view showing in dotted lines an extended adjustment of the frame.

A represents the central beam, which forms a part of the draft-beam, and carries the handles, B B, and the colter standard, C.

D E designate, respectively, the rearwardly divergent side-beams, arranged upon opposite sides of the central beam and capable of angular adjustment in relation thereto. The front ends of the side-beams are provided with vertical eyes, F F, which engage vertical pivot-pins, G G, attached to and carried by the central or main-beam, whereby the front ends of the side-beams are held close to the sides of the main-beam while their rear ends are capable of being adjusted toward or from the main-beam, as shown by the dotted lines in Fig. 2. To the rear ends of the side-beams are pivotally connected, by means of vertical bolts, H H, the adjusting straps, K K, the inner ends of said straps being longitudinally slotted, as shown at *k k*, to receive the vertical adjusting bolt, L, whereby by tightening said bolt the side-beams may be locked and held rigidly at any desired deflection from the line of the main-beam.

To the side-beam, D, are secured the plow-standards, M M, which may be of any approved design, either rigid or of the spring-tooth variety, the ordinary rigid form being shown in the drawings, and to the beam E are secured the harrow-teeth, N N, which, also, may be of any approved kind.

By loosening the adjusting bolt, by which the inner, overlapping ends of the adjusting straps are secured to the main-beam, either or both of the side-beams may be detached from the main-beam, so as to adapt the device for use as a side-plow or a side-harrow, or, (if both side-beams are removed and the plow standards are arranged upon the main beam) as an ordinary plow. The eyes at the front ends of the side-beams enable the parts to be readily detached for the purpose of adapting the cultivator to the character of the soil and the kind of work desired.

To prevent the rising and accidental detachment of the side-beams from the main beam, I provide the main-beam with a horizontal perforation, which registers with similar perforations, *m*, in the side-beams, and through these perforations I pass a retaining pin, M. This pin is removable to permit the detachment of the side-beams, and while in place it prevents the vertical movement or vibration of the same. The retaining pin is arranged near the pivotal points of the side-beams, and therefore, when the pin is in place it does not interfere with the lateral adjustment of either or both of the side-beams.

Having thus described my invention, what I claim, and desire to secure by Letters Patent of the United States, is—

In a cultivator, the combination with the central main-beam, of vertical pivot-pins attached to the sides of the main-beam near its front end, the rearwardly divergent side beams provided at their front ends with eyes pivotally mounted upon said pivot-pins, the slotted straps pivotally connected to the rear ends of the side-beams and adjustably connected at their overlapping inner ends to the main-beam, and a horizontal retaining pin, fitting in registering perforations in the side and main beams adjacent to the front or pivoted ends of the former, to prevent the accidental detachment of the side-beams from the main-beam without interfering with the relative adjustment of such parts, substantially as specified.

In testimony that I claim the foregoing as my own I have hereto affixed my signature in the presence of two witnesses.

GEORGE W. LEE.

Witnesses:
W. A. DUKE,
E. L. MENEFEE.